(12) United States Patent
Lin et al.

(10) Patent No.: US 9,436,883 B2
(45) Date of Patent: *Sep. 6, 2016

(54) COLLABORATIVE TEXT DETECTION AND RECOGNITION

(71) Applicant: A9.com, Inc., Palo Alto, CA (US)

(72) Inventors: Xiaofan Lin, Palo Alto, CA (US); Adam Wiggen Kraft, Mountain View, CA (US); Yu Lou, Stanford, CA (US); Douglas Ryan Gray, Mountain View, CA (US); Colin Jon Taylor, Orinda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,943

(22) Filed: Aug. 3, 2015

(65) Prior Publication Data

US 2015/0339536 A1    Nov. 26, 2015

Related U.S. Application Data

(63) Continuation of application No. 14/105,028, filed on Dec. 12, 2013, now Pat. No. 9,098,888.

(51) Int. Cl.
| | | |
|---|---|---|
| *G06K 9/18* | (2006.01) | |
| *G06K 9/00* | (2006.01) | |
| *G06T 7/00* | (2006.01) | |
| *G06K 9/22* | (2006.01) | |

(52) U.S. Cl.
CPC ............ *G06K 9/18* (2013.01); *G06K 9/00456* (2013.01); *G06K 9/00523* (2013.01); *G06K 9/228* (2013.01); *G06T 7/0081* (2013.01); *G06K 2209/01* (2013.01)

(58) Field of Classification Search
CPC ............. G06K 2209/01; G06K 9/723; G06K 9/00456; G06K 9/00664; G06K 9/325; G06K 9/3258; G06K 9/00463; G06K 9/3233
See application file for complete search history.

(56) References Cited

U.S. PATENT DOCUMENTS

| 5,809,183 A | * | 9/1998 | Serizawa | ............ G06K 9/3233 382/181 |
|---|---|---|---|---|
| 2002/0054693 A1 | * | 5/2002 | Elmenhurst | .............. G06K 9/03 382/101 |
| 2004/0262378 A1 | | 12/2004 | Ooki | |
| 2014/0169678 A1 | | 6/2014 | Chulinin | |
| 2014/0193075 A1 | | 7/2014 | Pavani et al. | |

OTHER PUBLICATIONS

US Non-Final Office Action issued in U.S. Appl. No. 14/105,028 dated Dec. 16, 2014.
US Notice of Allowance issued in U.S. Appl. No. 14/105,028 dated Apr. 1, 2015.

\* cited by examiner

*Primary Examiner* — Edward Park
(74) *Attorney, Agent, or Firm* — Hogan Lovells US LLP

(57) ABSTRACT

Various embodiments provide methods and systems for identifying text in an image by applying suitable text detection parameters in text detection. The suitable text detection parameters can be determined based on parameter metric feedback from one or more text identification subtasks, such as text detection, text recognition, preprocessing, character set mapping, pattern matching and validation. In some embodiments, the image can be defined into one or more image regions by performing glyph detection on the image. Text detection parameters applying to each of the one or more image regions can be adjusted based on measured one or more parameter metrics in the respective image region.

20 Claims, 7 Drawing Sheets

COLLABORATIVE TEXT DETECTION AND RECOGNITION

CROSS-REFERENCES TO RELATED APPLICATIONS

This application is a continuation of allowed U.S. application Ser. No. 14/105,028, entitled "COLLABORATIVE TEXT DETECTION AND," filed Dec. 12, 2013; of which the full disclosure of this application is incorporated herein by reference for all purposes.

BACKGROUND

Identifying text in photos and images is an important feature in mobile augmented reality applications. However, identifying text in an image can be complex and may involve multiple subtasks, including text detection, text recognition, and application-specific post-processing and information retrieval. Conventional approaches are to operate various text identification subtasks in an open-loop pipeline.

However, images or videos captured by mobile devices often have poor qualities because of motion and focus blur, light variations or noise, and/or limitations associated with built-in cameras. Conventional approaches in text identification are not ideal for these types of low quality images or videos. Improvements to the conventional approaches are desired.

BRIEF DESCRIPTION OF THE DRAWINGS

Various embodiments in accordance with the present disclosure will be described with reference to the drawings, in which.

DETAILED DESCRIPTION

Figure 1:
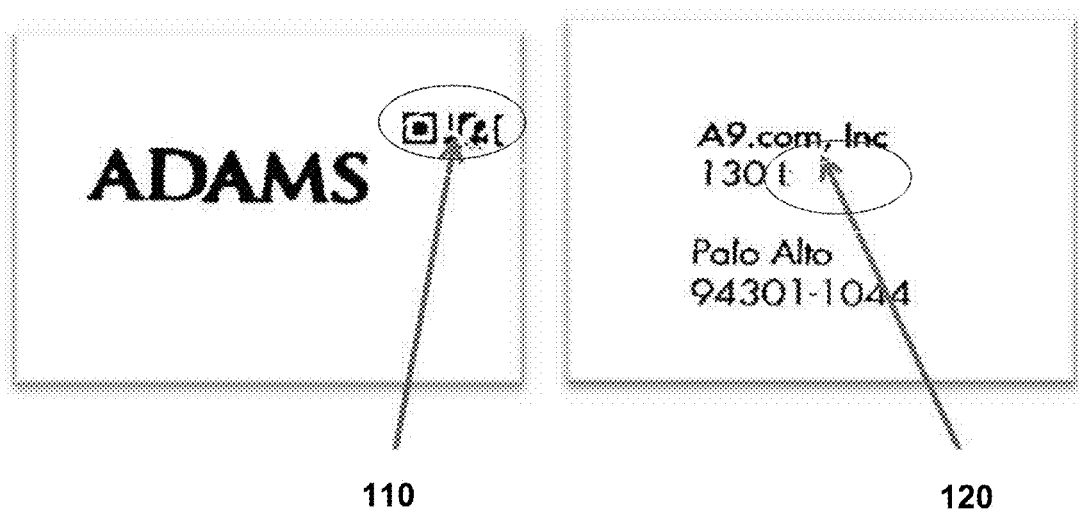
FIG. 1 illustrates an example of problems in text identification with a conventional open-loop pipeline.

Systems and methods in accordance with various embodiments of the present disclosure overcome one or more of the above-referenced and other deficiencies in conventional approaches to identifying text in an image. More specifically, various embodiments of the present disclosure enable a computing device to detect and recognize text in an image or video. In many instances, text in an image or video can be detected by applying a suitable set of text detection parameters or suitable text detection method based on parameter metric feedback from one or more text identification subtasks. In some embodiments, text identification subtasks may include one or more subtasks such as text detection, text recognition, preprocessing, character set mapping, pattern matching and validation. In some instances, text detection parameters can be adjusted based on parameter metrics measured by one or more text recognition engines in text recognition. At least one embodiment of the present disclosure solves a problem in defining threshold text detection parameters with the conventional approaches that regularly yields garbage outputs 110 or misses some real text 120, as illustrated in FIG. 1.

In some embodiments, text detection includes detecting text in a received image by applying a predetermined set of text detection parameters and identifying one or more regions in the image covered by text. The one or more regions can be defined by performing glyph detection on the received image. In some instances, glyph detection can include a process of extracting the maximally stable extremal regions (MSERs) from the image. An extremal region is a set of connected pixels that has grayscale values above a threshold and a size that does not change significantly when the threshold varies above the threshold value. In some embodiments, other region detection methods can also be used to define a received image into one or more regions such as, but not limited to, Harris-affine regions, Hessian-affine regions, Kadir-Brady saliency (KBS) regions, edge-based regions (EBR), and intensity extrema and salient regions. Each image region can be binarized to produce a text mask that includes text in the corresponding region.

Some embodiments provide detected text or a binarized text mask of each image region to a text recognition engine, such as an optical character recognition (OCR) engine, for text recognition. In many instances, a percentage of each image region that is covered by detected text glyphs can be determined, and text recognized by the text recognition engine can be assigned a confidence score. In some instances, the confidence score is determined by a confidence module that corresponds to the text recognition engine. The confidence score can be a probability associated with the accuracy of the recognized text by the text recognition engine. In some embodiments, a dominant word height in each image region can also be determined by the text recognition engine.

In some embodiments, when a predetermined set of conditions are satisfied, text detection parameters applying to each image region can be adjusted based on parameter metric feedback on the respective image region from one or more text recognition engines. The original image can go through the image detection process again by applying the adjusted text detection parameters to each respective image region. In some instances, the predetermined set of conditions may include one or more conditions such as: more than a threshold percentage of the image region is covered by detected text glyph, more than a threshold percentage of detected glyph area is covered by recognized words that have at least a threshold confidence score, and dominant word height in each image region is less than a threshold upper limit.

In at least one embodiment, when applications operate in a continuous mode or images are from the same video, the adjusted text detection parameters can be applied to a future image, rather than the original image. In some embodiments, text detection parameters can be adjusted based on parameter metric feedback on the first video image from one or more text recognition engines. The adjusted text detection parameters can remain unchanged for remaining video images in the same video. When a new video is received or a new continuous mode starts, text detection parameters can be adjusted again based on parameter metric feedback on a first video image of the new video. In some instances, the adjusted text detection parameters can remain unchanged for a predetermined number N of video images or within a predetermined time frame T, and then the text detection parameters can be adjusted again based on parameter metric feedback on the Nth video image or first video image after time T, respectively.

In some other embodiments, a different text detection method can be selected and applied to an original image or a future image based on parameter metric feedback on the original image from one or more text recognition engines. For instance, a text detection method suitable for book-page images may be selected and applied based on the parameter metric feedback.

Various embodiments provide parameter metric feedback for adjusting text detection parameters. In some embodiments, text detection parameters can be adjusted based on feedback from one or more text identification subtasks in the pipeline. For instance, parameter feedback on an image from text identification subtasks, such as preprocessing, character set mapping, pattern matching and validation, can be used to adjust text detection parameters applying to one or more regions of the image. In some embodiments, feedback (e.g., ambient light, camera gain, gyro-acceleration stability) from sensors of the computing device may also be used to adjust text detection parameters applying to the one or more image regions. In some embodiments, text identification results can be analyzed and used to adjust text recognition parameters. For example, text detection parameters for each image region can be adjusted by analyzing text identification results of the respective image region. In some embodiments, when no or little text is recognized over a predetermined time period in a session, the user of the computing device can be prompted to disable the text identification function to save power. In some instances, text identification function can be automatically disabled on the computing device if no or little text is recognized after the predetermined time period in a session.

Various other functions and advantages are described and suggested below as may be provided in accordance with the various embodiments.

Figure 2:
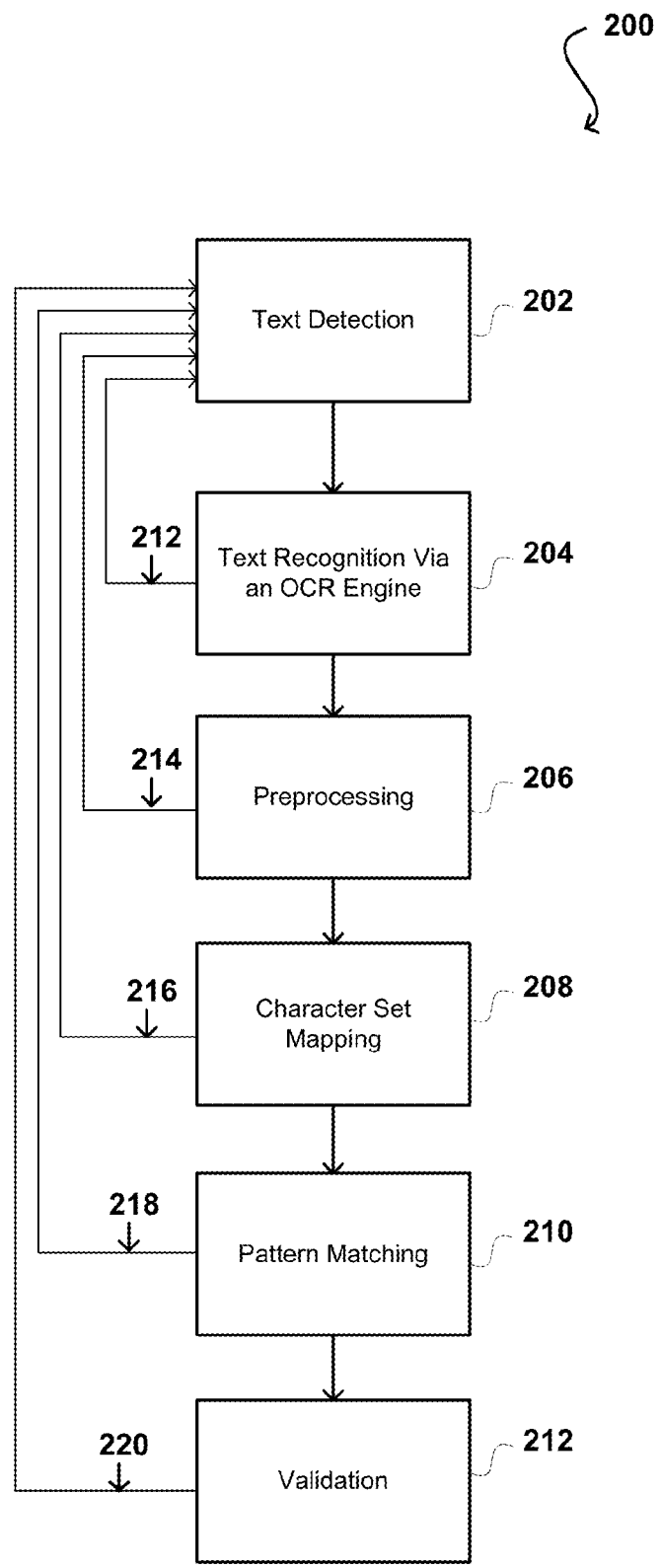
FIG. 2 illustrates an example of a flow diagram illustrating a process for identifying text in an image by taking into account parameter metric feedback from one or more text identification subtasks in accordance with various embodiments.

FIG. 2 an example of a flow diagram illustrating a process 200 for identifying text in an image by taking into account parameter metric feedback from one or more text identification subtasks in accordance with various embodiments of the present disclosure. The process 200, or any other process described herein or variations and combinations thereof, may be performed on a computing device, such as a smartphone, tablet computer, or any device capable of receiving input from and providing output to a user in accordance with various embodiments discussed herein. By way of examples, the devices can include a laptop computer, a portable media player, an e-book reader, a personal digital assistant (PDA), a portable computer, a tablet PC, a head-mounted display, a wearable computer, an interactive kiosk, a mobile phone, a single-board computer (SBC), an embedded computer system, a wearable computer (e.g., a watch or glasses), or a combination of two or more of these.

In this example, the text identification process 200 begins by text detection 202 of a received image. The text detection process can include one or more text identification subtasks as described herein. In some instances, text detection of an image starts detecting glyph in the image by applying a predetermined set of text detection parameters. The image can then be separated into one or more regions of similar grayscale values that fall within predefined size constraints called glyphs. Character classification is performed on the one or more image regions by removing any glyph that are not characters according to machine learning algorithms or any other suitable algorithms. A detected glyph can be grouped into words and lines by performing pair finding and/or word finding. Lines for the top and bottom points on the words and lines can be estimated by performing baseline estimation on these words and lines. Word and line splitting can be performed by examining the spaces between the glyphs to decide word boundaries used for evaluation or display purposes. Each of the one or more image regions can then be binarized into a text mask that includes any punctuation that may have been filtered out in earlier steps due to a minimum size constraint. In at least one embodiment, the one or more image region with binarized text or text mask can be compressed into a PNG file and sent to a text recognition engine (e.g., an OCR engine) for text recognition 204.

In some embodiments, glyph detection can further include identifying one or more regions in a received image by performing one or more suitable region detection methods. The identified regions may include, but are not limited to, maximally stable extremal regions (MSERs), Harris-affine regions, Hessian-affine regions, Kadir-Brady saliency (KBS) regions, edge-based regions (EBR) regions, and intensity extrema and salient regions. For example, an extremal region is a set of connected pixels that have grayscale values above a threshold and has a size that does not change significantly when the threshold varies above the threshold value. In addition, an extremal region can contain most of the edge intensity found by computing a gradient image beforehand. Regions that either have too many or too few pixels, and any MSER whose aspect ratio is too different from normal text or which has more than three child regions, can be ignored. Although the MSERs are discussed in details, it should be understood that other types of regions may also be identified via characteristic points making correspondences between textures, objects and panoramas in an image in accordance with various embodiments of the present disclosure. For example, Harris-affine regions are a set of similar areas taken from different viewpoints that are related by a simple geometric transformation, such as scaling, rotation and shearing. For another example, Hessian-affine regions can be defined by using extracted features to infer the contents of the features. For yet another example, KBS regions can be defined as areas with distinct and representative feature(s).

In many instances, character classification may further include extracting features from each MSER, the features including: Bounding Box Aspect Ratio (width over height), Compactness (4 pi times area over perimeter squared), Raw Compactness (4 pi times number of pixels over perimeter squared), Stroke Width (estimated using distance transform) divided by width, Stroke Width (estimated using distance transform) divided by height, Solidity (area over bounding box area), Convexity (convex hull perimeter over perimeter), and Number of Holes (e.g., a 'b' has 1 hole, a 'B' has 2 holes, a 'T' has 0 holes). A fixed set of features can be selected and used to train a classifier using a machine learning algorithm such as a support vector machines (SVM) or AdaBoost. A classifier can be used to reject most non-characters from the list of characters, and an operating point on the receiver operating characteristic (ROC) curve can be chosen so that most characters are detected (ie. a low false negative rate), but with a high false positive rate.

In some embodiments, pair finding can include sorting the remaining glyphs (MSERs which appear to be characters) left to right, and all pairs that pass a test can be considered a possible character pair. The test compares the distance between glyphs, vertical overlap of two glyphs, their relative height, width, stroke width, and intensity. Word line finding, in accordance with at least one embodiment, can further include treating each glyph as a vertex in a graph and each pair as an edge, then using an iterative dynamic programming algorithm to extract the best (e.g., the longest) sequence of edges, where the longest edges become word candidates. Additionally or alternatively, word line finding can include selecting glyphs from left to right after three glyphs are found to be in a good sequence.

In at least one embodiment, base line estimation can include estimating the slope of the baseline using a clustering algorithm and computing intercepts that minimize the minimum distance between baselines and glyphs. Each word candidate can have at least two lines in the top and bottom points of the glyphs, and if two or more words appear to have the same baselines, they can be merged and the lines can be re-estimated. In some embodiments, glyph refinement can be performed after baseline estimation is performed, where all glyphs that are classified as non-text, but fit into the baseline configuration, are included. Word splitting can further include estimating the spaces between glyphs in each baseline and choosing a threshold, where any gap between characters greater than that threshold can be considered to be a word boundary (space) and can be marked as such. Further, binarization may include binarizing each region in the bounding box based at least in part on the threshold used to compute the regions character and the regions character's neighbors.

In this example, the OCR engine analyzes the binarized text or text mask to recognize text in the one or more image regions. In some embodiments, the OCR engine may determine a percentage of each image region that is covered by detected text glyphs and assign a confidence score for the detected text. In some instances, the confidence score is determined by a confidence module that corresponds to the OCR engine. The confidence module can determine a probability associated with the accuracy of the recognized text. To determine the probability or confidence score, the confidence module may take into account various attributes of ordinary text. For example, determining an identified text corresponding to a dictionary word can increase the confidence score for the identified text. For another example, if an identified text is determined to have incoherent patterns, such as high frequency of repeating the same character and the like, the incoherent patterns can decrease the confidence score for the identified text.

In some embodiments, the OCR engine or the confidence module may include a conversion table that is generated based on the statistical analysis of comparing testing results against the ground truth of one or more training sets of known text. The conversion table can be used to estimate the confidence score for future unknown text from the one or more image regions. Various other methods may also be used to determine or estimate a confidence score for detected text. In some embodiments, the OCR engine may also determine dominant OCR word height of detect text in the one or more image regions.

Some embodiments analyze the binarized text or text mask by using one or more OCR engines. The confidence score can be determined by weighting confidence scores from the one or more OCR engines. Each OCR engine can report coordinates of a bounding box for the recognized text. The bounding box for the recognized text can be used to align the recognized text from each OCR engine to determine a correspondence. An overlap percentage of the bounding boxes can be used to map recognized text from one OCR engine to recognized text from another OCR engine. If the recognized text received from each OCR engine is not identical, then each word within the recognized text is assigned a final confidence score based a combination function, such as a linear function, that is a combination of each OCR engine weighted by a respective confidence score. Other factors, such as past performance of a particular engine can also be factored into the weighting or linear function.

When a predetermined set of conditions are satisfied, the OCR engine may provide parameter metric feedback 212 to test detection 202. Text detection parameters applying to each image region in the text detection 202 can be adjusted based on parameter metric feedback 212 from the OCR engine. The original image can go through the text detection 202 again with the adjusted text detection parameters for each respective image region.

In some embodiments, the predetermined set of conditions may include one or more conditions such as: above a threshold percentage of the one or more image regions is covered by detected text glyphs, above a threshold percentage of detected glyph area is covered by OCR words that have confidence scores above a threshold confidence value, and dominant word height in each image region is less than a threshold upper limit.

Figures 3A, 3B:
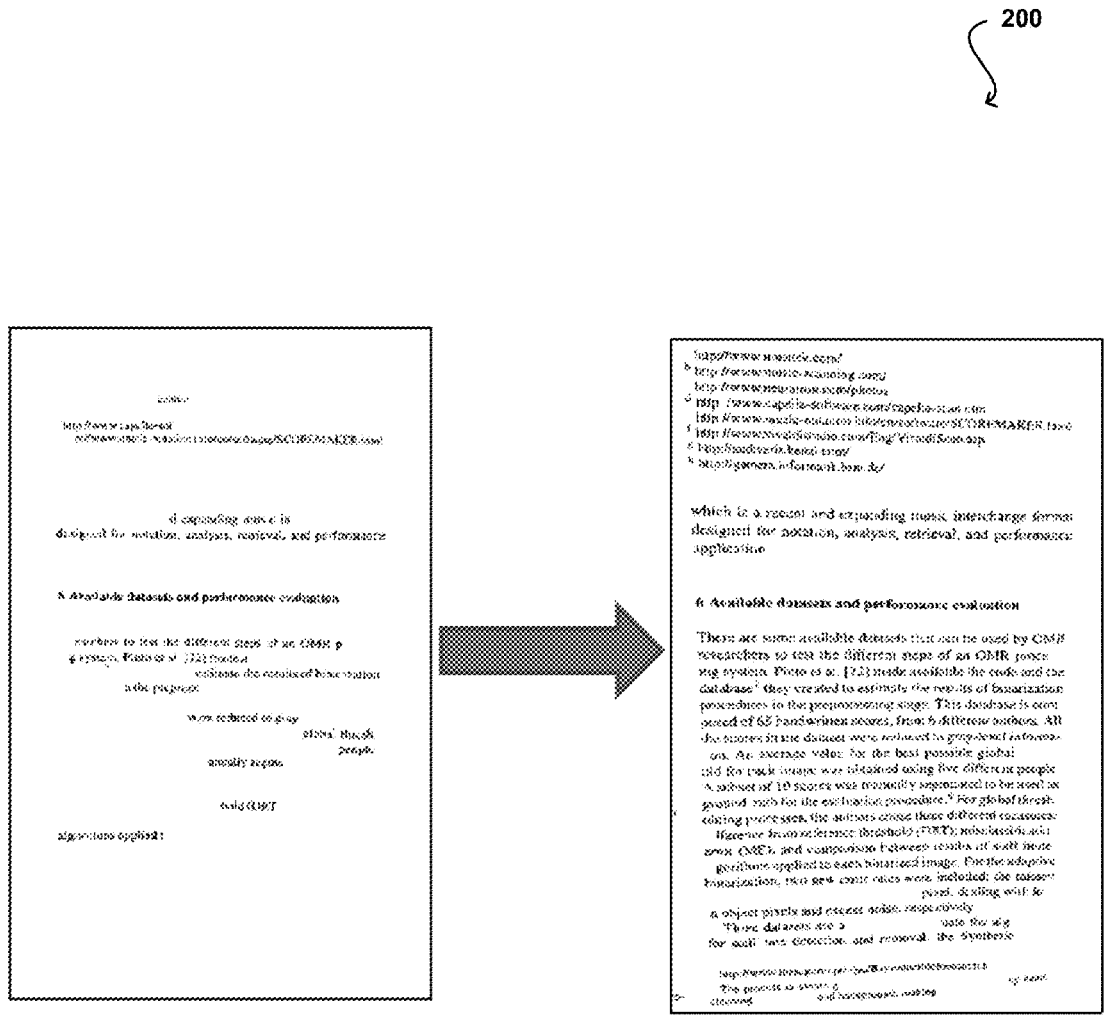
FIGS. 3(A) and 3(B) illustrate an example of detecting text by applying adjusted text detection parameters in accordance with various embodiments.

When applications operate in a continuous mode or continuous images are from the same video, some embodiments apply the adjusted text detection parameters to a future image, rather than the original image. Therefore, computation for text detection 202 and text recognition 204 can be substantially unchanged, which results in optimized text detection and recognition performance without increasing text detection and recognition time. FIG. 3 illustrates an example of detecting text in an image by applying adjusted text detection parameters in accordance with various embodiments. In FIG. 3(A), a predetermined set of text detection parameters are applied to Nth frame of a video, while in FIG. 3(B), an adjusted set of text detection parameters are applied to N+1th frame of the video. It can be seen that much more texts are identified in FIG. 3(B) than those in FIG. 3(A). Also, as illustrated in FIG. 3(B), there is little garbage text or missing text by applying the adjusted set of text detection parameters.

One example of statistical analysis on a video dataset is provided in TABLE 1. It can be seen that many more instances of small text can be identified by applying an adjusted set of text detection parameters in accordance with various embodiments of the present disclosure.

TABLE 1

|  | Tracking 2 (regular text) | Small1 (small text) | Small2 (small text) |
| --- | --- | --- | --- |
| Text detection with a predetermined set of parameters | 2374 | 393 | 561 |
| Text detection with adjusted set of parameters | 2406 | 714 | 774 |

In at least one embodiment, text detection parameters for a video or continuous images can be adjusted based on parameter metric feedback 212 from one or more text recognition engines on the first image and remain unchanged for remaining images within the same video. When a new video is received or a new continuous mode starts, text detection parameters can be adjusted again based on parameter metric feedback 212 on the new video. In some embodiments, the adjusted text detection parameters can be applied to a predetermined number of video images or be kept unchanged within a predetermined time frame.

In some embodiments, different text detection methods or algorithms can be selected and applied to an original image based on parameter metric feedback 212 on the original image from one or more OCR engines. For example, when the parameter metric feedback 212 indicates that the image is a book page, a text detection method or algorithm suitable for book-page images may be selected and applied based on the parameter metric feedback 212. Various techniques (e.g., OCR and other text recognition processes) can be used as the primary image and text analysis technique or to enhance other processes. Some techniques are described in co-pending U.S. patent application Ser. No. 13/929,689, filed Jun. 27, 2013, entitled "METHOD AND SYSTEM FOR AUTO-MATICALLY ANALYZING AN OCR FRAME FOR PRODUCT SEARCH," co-pending U.S. patent application Ser. No. 13/688,772, filed Nov. 29, 2012, entitled "HIGH PERFORMANCE OCR SOLUTION FOR AUGMENTED REALITY APPLICATIONS," and co-pending U.S. patent application Ser. No. 13/842,433, filed Mar. 15, 2013, entitled "SEMI-STRUCTURED TEXT ENTITY RECOGNITION FROM NATURAL SCENE IMAGES," which are hereby incorporated herein by references in their entirety.

The output of the OCR engine at text recognition 204 may comprise one or more text lines. For example, the one or more text lines can be a collection of words, grouped by lines. If the collection of words is not grouped in one or more lines, a word line aggregation process can be performed. Each word in the text line can be processed separately. For example, each line can be processed into a simple string with a space inserted between each word. For each string, a cascade of heuristic operations/tests can be performed at preprocessing 206. In some embodiments, the preprocessing 206 is included for speed and efficiency of text detection and recognition and may not have any significant effect on text recognition accuracy. For example, any string of numbers has length less than seven can be automatically determined not to be a U.S. phone number. A string must have at least three characters and at least one period to qualify as a URL candidate and, in order to qualify as an email candidate, a string must have both an '@' sign and a period. These simple tests in the preprocessing 206 can save processing time on images containing no text glyphs while may have little impact on images having one or more text glyphs.

In this example, character set mapping 208 performs a character set mapping operation on preprocessing 206 results by assigning each character of the isolated strings to a character class to produce a character class string. In at least one embodiment, the isolated strings, that comprise multiple different characters (e.g., a, b, c, 1, 2, 3, etc.), are translated into a character class representation. For example, phone numbers and ASCII characters can be mapped to one of eight character classes which include a digits class (e.g., 1, 2, 3 . . . ), open and close parenthesis class, dash/dot class (e.g., '.' and '-'), space class, an upper and lower case letters classes, and a class for remainder ASCII characters. Eleven classes, including an upper and lower case letters classes, digits class, period, dash, space, slash, '@' sign, colon, tilde, and a class for the remainder of characters but not a part of one of the aforementioned classes, are used in URLs and email addresses. Pattern matching 210 can run a pattern matching algorithm to analyze the pattern of the character string and determine whether it is a phone number, an email address, or a URL. Validation 210 can automatically check and verify text recognition results from character set mapping 208.

In some embodiments, text detection parameters can be adjusted based on parameter metric feedback from one or more text identification subtasks in the pipeline. Parameter metric feedback may include one or more feedback from text identification subtasks, such as feedback 212 from text recognition 204, feedback 214 from preprocessing 206, feedback 216 from character set mapping 208, feedback 218 from pattern matching 210 and feedback 220 from validation 212. In some instances, text identification results of one or more image regions can also be analyzed and used to adjust text detection parameters that are applied to the respective image region in text detection 202. In some embodiments, feedback (e.g, ambient light, camera gain, gyro-acceleration stability) from sensors of the computing device may also be analyzed and used to adjust text detection parameters in text detection 202.

In some embodiments, the user of the computing device can be prompted to disable the text identification function to save power when no or little text is recognized over a predetermined time period in a session. In some other embodiments, text identification function can be automatically disabled on the computing device if little text is recognized over a predetermined time period of a session.

Various other types of methods to detect and recognize text in an image are also possible, some of which are discussed in further detail elsewhere herein.

Figure 4:
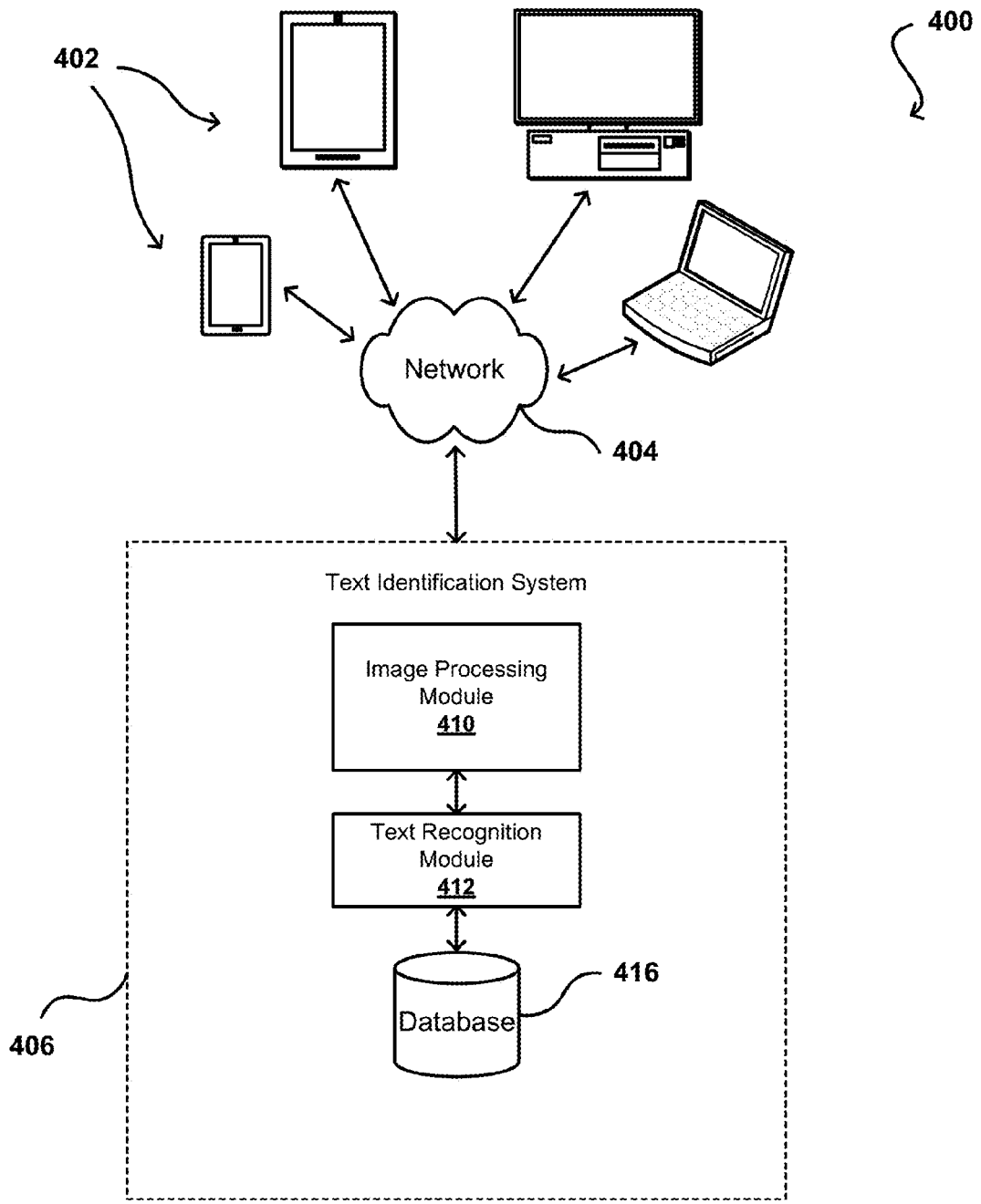
FIG. 4 illustrates an example system for text identification that can be used in accordance with various embodiments.

FIG. 4 illustrates an example of an environment 400 in which various aspects of the embodiments can be implemented and/or utilized. It should be understood that the example system is a general overview of basic components, and that there can be many additional and/or alternative components utilized as known or used in the art for identifying text in multiple images. In this example, a user is able to utilize a computing device 402, such as a personal computer, tablet computer, smart phone, and the like, to access a Text Identification system (e.g., an OCR system) or service 406 over at least one wired and/or wireless network 404, such as the Internet, an Intranet, a cellular network, a local area network (LAN) and the like, for communicating digital information. The computing device 402 can capture one or more images (or video) of text and send the images to the Text Identification system or service 406 over the at least one appropriate network 404. The Text Identification system 406 includes an image-processing module 410 that can apply different operators or techniques to pre-process the images before submitting the images to one or more text recognition modules 412. Examples of the operators include a Laplacian-of-Gaussian filter, thresholding filters, and so forth, which enhance or mitigate different characteristics of the images. Examples of these characteristics include intensity, blurriness, and so forth. After pre-processing, the one or more text recognition engines of the text recognition module 412 concurrently recognize text from the image to produce multiple recognized text outputs. In at least one embodiment, a processor can analyze the recognized text using a database 416 of words in order to improve the recognition. The database 416 includes a set of words which the processor can search for matches corresponding to words present in the recognized text. At least a portion of these tasks can be performed on a portable computing device or by using at least one resource available across a network as well. In at least some embodiments, a text recognition application (e.g., an OCR application) can be installed on the computing device 402, such that much of the processing, analyzing, or other such aspects can be executed on the computing device. Various processing steps can be performed by the computing device 402, by the Text Identification system 406, or a combination thereof. Therefore, it should be understood that the components and capabilities of the Text Identification system 406 could wholly or partly reside on the computing device 402. In some embodiments, various processing steps can be implemented in one or more flow state engines and/or one or more core device-side computer vision engines of the Text Identification system 406, and/or other mobile applications.

In some embodiments, the computing device 402 is a portable computing device and the Text Identification system 406 is a server such as an application server, a web server, etc. The portable computing device may include a camera, an interface (e.g., a display element) that displays the field of view of the camera, and a processing component. The camera can include a lens and an image sensor that converts an optical image into an electrical signal. The portable computing device can capture images in different directions and the interface can display captured images. The processing component processes the captured images to detect text in the images. For example, the processing component can implement algorithms that detect and recognize one or more regions of the image covered by text. The one or more image regions may be cropped to create one or more regions with cropped text. The one or more regions of cropped text can be binarized and be further processed on the portable computing device. In some other embodiments, the one or more regions of cropped text can be sent to the server for further processing. In some instances, a grey scale image, color image or any other image (cropped or otherwise not cropped) can be sent to the server (or remain on the portable computing device) for further processing.

Figure 5:
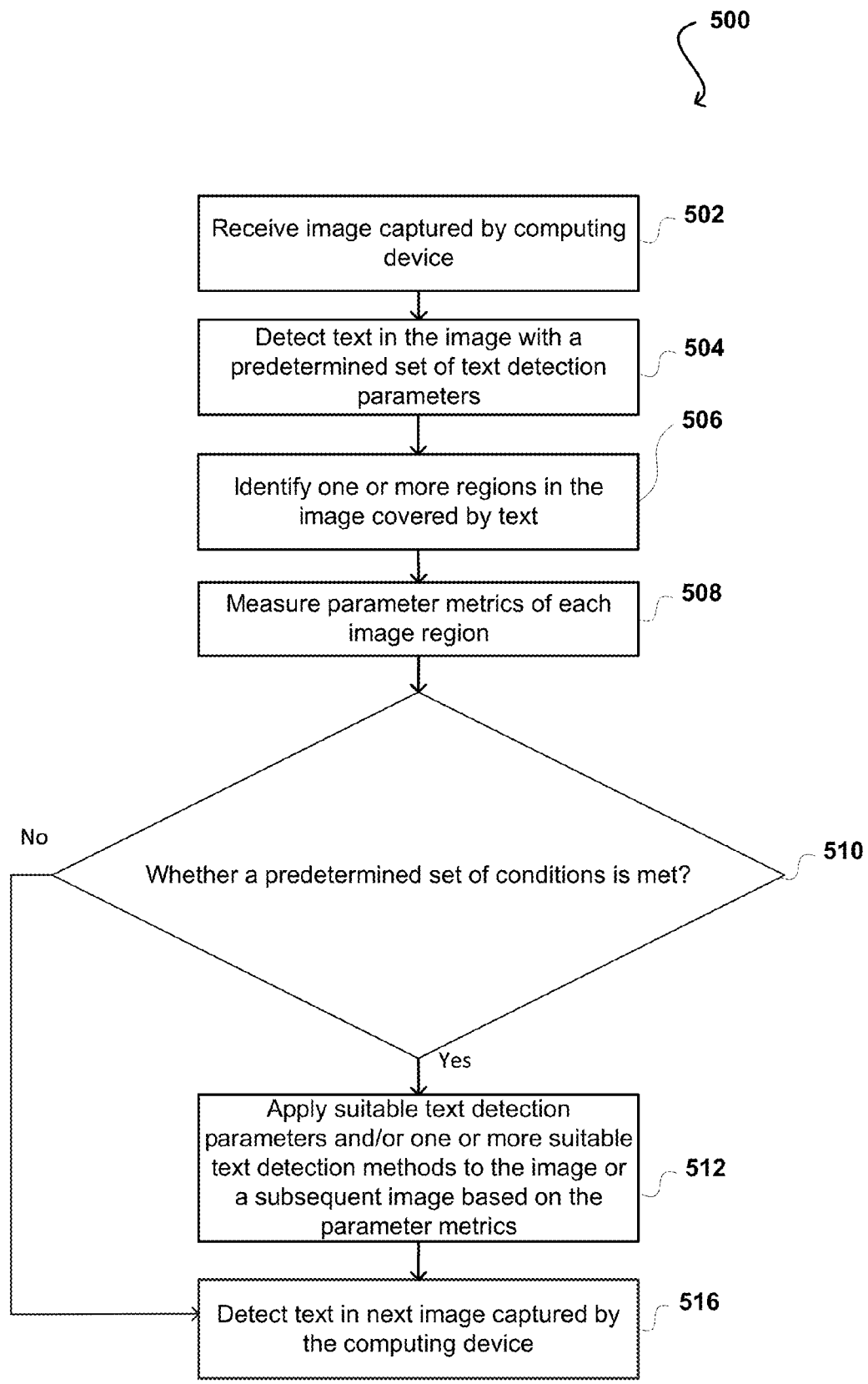
FIG. 5 illustrates an example process for text identification that can be utilized in accordance with various embodiments.

FIG. 5 illustrates an example process for text identification that can be utilized in accordance with various embodiments. It should be understood that there can be additional, fewer, or alternative steps performed in similar or alternative orders, or in parallel, within the scope of the various embodiments unless otherwise stated. In this example, an image or video captured by a computing device can be received 502. In some instances, the image or video can be any digital or non-digital picture produced by a person or a camera (e.g., traffic camera, toy camera, single-lens reflex camera, twin-lens reflex camera, movie camera, pinhole camera, rangefinder camera, game/remote camera, mirrorless interchangeable-lens camera, and view camera). Text in the received image can be detected by applying a predetermined set of text detection parameters 504.

In this example, one or more image regions covered by text can be identified 506. In some instances, the one or more regions can be identified by performing glyph detection on the image. Some embodiments provide various region detection methods to define the received image into the one or more image regions. For example, region detection methods, such as blob detection, feature detection and interesting point detection, may be used in determining the one or more text regions in the received image. Detected text or binarized text mask can be provided to one or more text recognition engines for text recognition. Parameter metrics of each of the one or more image regions can be measured 508. When a predetermined set of conditions are met, suitable text detection parameters and/or one or more suitable text detection methods for each of the one or more image regions can be determined based on the parameter metrics. The suitable text detection parameters and/or one or more suitable text detection methods can then be applied 512 to the one or more text regions of the image or a subsequent image for text detection. When the predetermined set of conditions are not satisfied or text detection in the received image with the suitable detection parameters or methods is done, text in the next image captured by the computing device can be detected 516.

In some embodiments, the predetermined set of conditions may include, but not limited to, at least one condition from a plurality of conditions comprising: more than a threshold percentage of the image region is covered by detected text glyph, more than a threshold percentage of detected glyph area is covered by OCR words that have at least a threshold confidence score, and dominant word height in each image region is less than a threshold upper limit. In some instances, when the applications operate in a video or continuous mode, the suitable set of text detection parameters determined from an image may be applied to a future image, rather than the original image. The suitable text detection parameters may remain unchanged for images in the same set of video, within a predetermined period of time, or for a predetermined number of images.

Many embodiments provide parameter metric feedback from various sub-tasks in text identification process. In some instances, parameter metric feedback may be from one or more sub-tasks, such as text recognition, preprocessing, character set mapping, pattern matching and validation. Text identification results may also be used to adjust text detection parameters. In some embodiments, sensor feedback (e.g., ambient light, camera gain, gyro-acceleration stability) from the computing device is also used to determine suitable text detection parameters or methods. Various other options exist as well within the scope of the various embodiments.

Figures 6A, 6B:
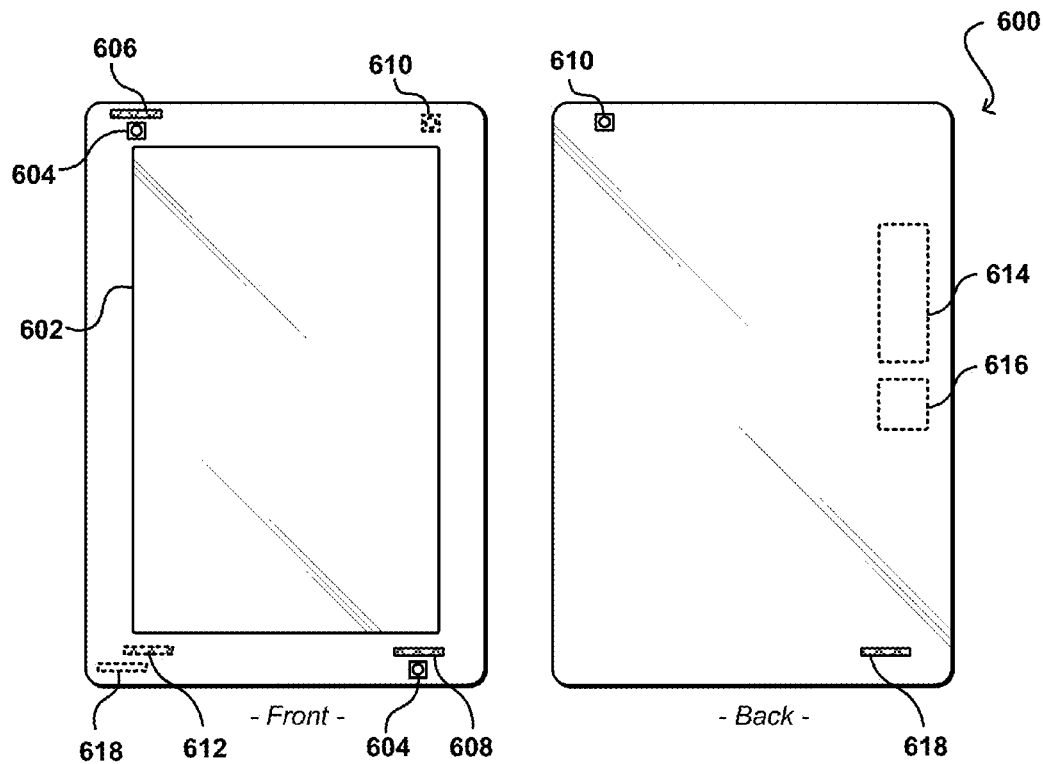
FIGS. 6(A) and 6(B) illustrate an example computing device that can be used to implement aspects of the various embodiments.

FIGS. 6A and 6B illustrate front and back views, respectively, of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one computing mechanism 614, such as may include at least one wired or wireless component operable to communicate with one or more electronic devices. The device also includes a power system 616, such as may include a battery operable to be recharged through al plug-in approaches, or through other approaches such as capacitive charging through proximity with a power mat or other such device. Various other elements and/or combinations are possible as well within the scope of various embodiments.

Figure 7:
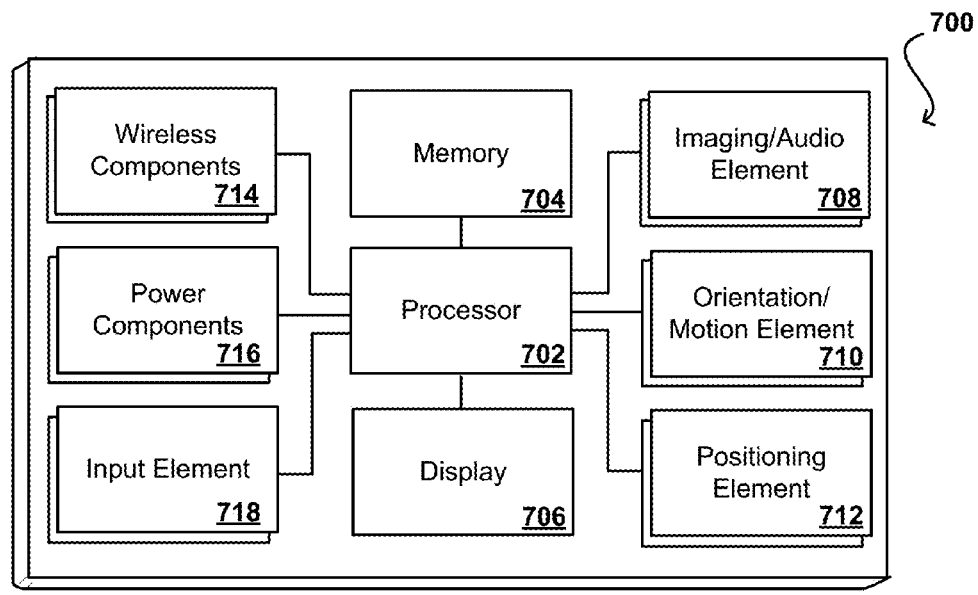
FIG. 7 illustrates example components of a computing device such as that illustrated in FIGS. 6(A) and 6(B)

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of computing approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging/audio element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation/motion determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more al wired communications connections as known in the art.

The device also includes a power system 716, such as may include a battery operable to be recharged through al plug-in approaches, or through other approaches such as capacitive charging through proximity with a power mat or other such device. Various other elements and/or combinations are possible as well within the scope of various embodiments.

In some embodiments the device can include at least one additional input device 718 able to receive al input from a user. This al input can include, for example, a push button, touch pad, touch screen, wheel, joystick, keyboard, mouse, keypad, or any other such device or element whereby a user can input a command or a request for additional product information to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 8:
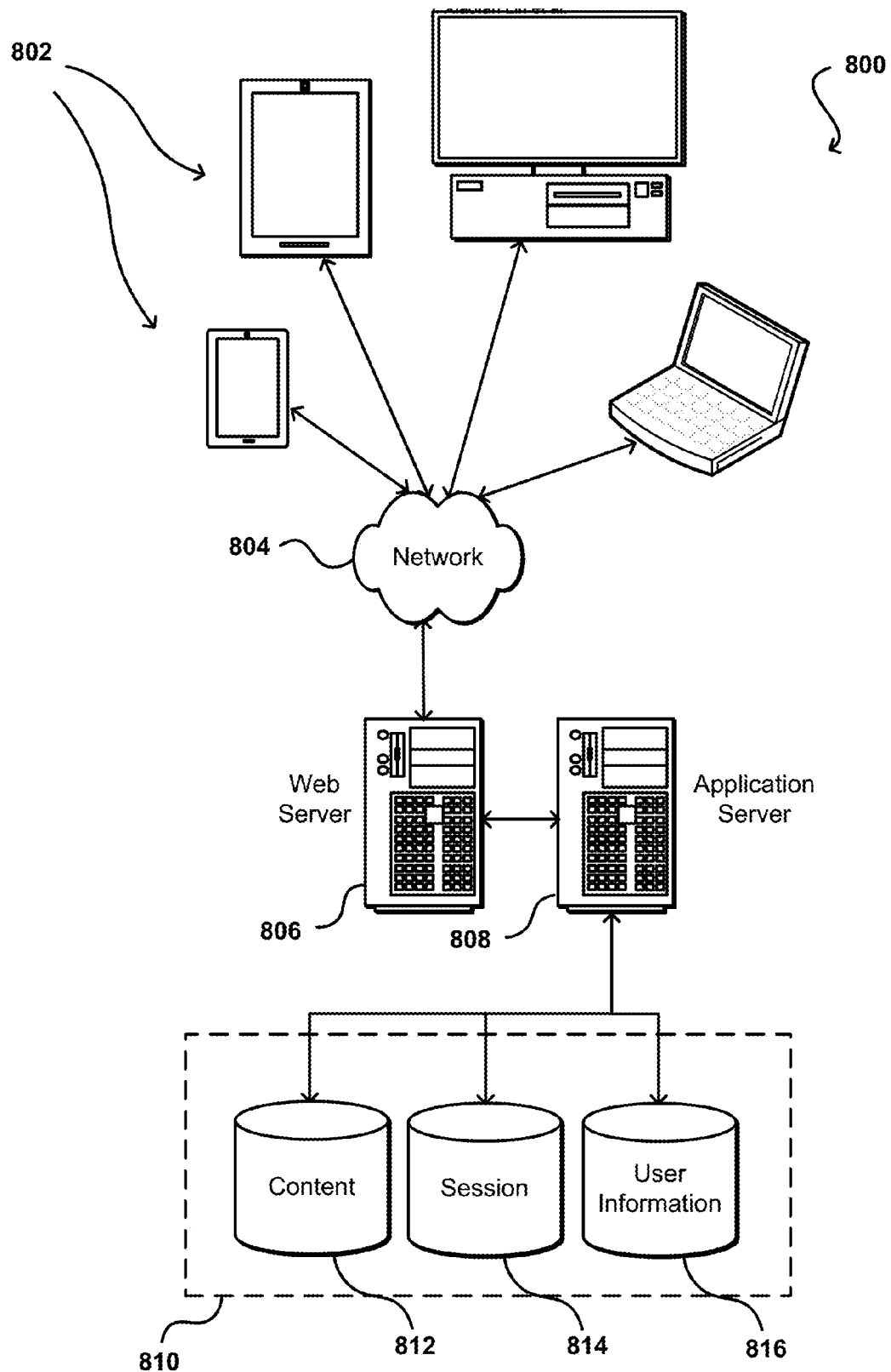
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic computing device 802, which can include any appropriate device operable to send and receive requests, messages or information over an appropriate network 804 and convey information back to a user of the device. Examples of such computing devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the computing device. In a "pull" network, one or more of the servers send data to the computing device upon request for the data by the computing device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the computing device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the computing device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or computing devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving image data captured by a computing device;
detecting text in the image data using at least one text detection parameter;
determining that the text detected in the image data is recognized text;
determining one or more parameter metrics of the image data;
generating at least one modified text detection parameter based at least on the determined one or more parameter metrics and sensor data received from the computing device including ambient light, camera gain, and gyro-acceleration stability of the computing device; and
applying the at least one modified text detection parameter to the image data.

2. The computer-implemented method of claim 1, further comprising:
generating, in response to a quantity of the recognized text being less than a threshold amount within a predetermined time, a notification to disable a text identification function on the computing device.

3. The computer-implemented method of claim 1, further comprising:
causing a text identification function on the computing device to be placed in a disabled state in response to a quantity of the recognized text being less than a threshold amount within a predetermined time.

4. The computer-implemented method of claim 1, wherein the one or more parameter metrics are measured in one or more text identification subtasks, the one or more text identification subtasks including text recognition, preprocessing, character set mapping, pattern matching, or validation.

5. The computer-implemented method of claim 1, further comprising:
determining one or more image regions in the image data, each of the one or more image regions covered by at least a portion of the text detected in the image data;
determining the one or more parameter metrics of the image data that correspond to each of the one or more image regions;
adjusting the at least one modified text detection parameter that applies to an image region of the one or more image regions, based on the determined one or more parameter metrics that correspond to the respective image region of the one or more image regions; and
applying the adjusted at least one modified text detection parameter to the respective image region of the one or more image regions.

6. The computer-implemented method of claim 5, wherein the one or more image regions include at least one image region from a plurality of image regions comprising: maximally stable extremal regions (MSERs), Harris-affine regions, Hessian-affine regions, Kadir-Brady saliency (KBS) regions, edge-based regions (EBR), and intensity extrema and salient regions.

7. The computer-implemented method of claim 5, wherein the one or more image regions in the image data are determined by performing glyph detection on the image data.

8. The computer-implemented method of claim 7, further comprising:
determining that one or more conditions are met,
wherein the one or more conditions includes a condition that more than a threshold percentage of an image region, of the one or more image regions in the image data, is covered by a detected glyph.

9. The computer-implemented method of claim 7, further comprising:
determining that one or more conditions are met; and
assigning a confidence score to the recognized text,
wherein the one or more conditions includes a condition that a percentage of detected glyph area covered by the recognized text that has at least a threshold confidence score is larger than a lower limit value.

10. The computer-implemented method of claim 1, further comprising:
determining that one or more conditions are met; and
determining dominant word height of the text detected in the image data,
wherein the one or more conditions includes a condition that the dominant word height is less than a threshold value.

11. The computer-implemented method of claim 1, further comprising:
applying the at least one modified text detection parameter to one of subsequent image data received after the image data.

12. A non-transitory computer-readable storage medium including instructions that, when executed by at least one processor of a computing system, cause the computing system to:
receive image data captured by a computing device;
detect text in the image data using at least one text detection parameter;
determine that the text detected in the image data is recognized text;
determine one or more parameter metrics of the image data;
generate at least one modified text detection parameter based at least on the determined one or more parameter metrics and sensor data received from the computing device including ambient light, camera gain, and gyro-acceleration stability of the computing device; and
apply the at least one modified text detection parameter to the image data.

13. The non-transitory computer-readable storage medium of claim 12, wherein the instructions when executed further cause the computing system to:
generate, in response to a quantity of the recognized text being less than a threshold amount within a predetermined time, a notification to disable a text identification function on the computing device.

14. The non-transitory computer-readable storage medium of claim 12, wherein the instructions when executed further cause the computing system to:
cause a text identification function on the computing device to be placed in a disabled state in response to a quantity of the recognized text being less than a threshold amount within a predetermined time.

15. The non-transitory computer-readable storage medium of claim 12, wherein the one or more parameter metrics are measured in one or more text identification subtasks, the one or more text identification subtasks including text recognition, preprocessing, character set mapping, pattern matching, or validation.

16. The non-transitory computer-readable storage medium of claim 12, wherein the instructions when executed further cause the computing system to:
determine one or more image regions in the image data, each of the one or more image regions covered by at least a portion of the text detected in the image data;
determine the one or more parameter metrics of the image data that correspond to each of the one or more image regions;
adjust the at least one modified text detection parameter that applies to an image region of the one or more image regions, based on the determined one or more parameter metrics that correspond to the respective image region of the one or more image regions; and
apply the adjusted at least one modified text detection parameter to the respective image region of the one or more image regions.

17. The non-transitory computer-readable storage medium of claim 16, wherein the one or more image regions in the image data are determined by performing glyph detection on the image data.

18. The non-transitory computer-readable storage medium of claim 17, wherein the instructions when executed further cause the computing system to:
determine that one or more conditions are met,
wherein the one or more conditions includes a condition that more than a threshold percentage of an image region, of the one or more image regions in the image data, is covered by a detected glyph.

19. A system for identifying text in an image, comprising:
at least one processor; and
memory including instructions that, when executed by the at least one processor, cause the system to:
receive image data captured by a computing device;
detect text in the image data using at least one text detection parameter;
determine that the text detected in the image data is recognized text;

determine one or more parameter metrics of the image data;

generate at least one modified text detection parameter based at least on the determined one or more parameter metrics and sensor data received from the computing device including ambient light, camera gain, and gyro-acceleration stability of the computing device; and apply the at least one modified text detection parameter to the image data.

20. The system of claim 19, wherein the instructions when executed further cause the system to:

determine one or more image regions in the image data, each of the one or more image regions covered by at least a portion of the text detected in the image data;

determine the one or more parameter metrics of the image data that correspond to each of the one or more image regions;

adjust the at least one modified text detection parameter that applies to an image region of the one or more image regions, based on the determined one or more parameter metrics that correspond to the respective image region of the one or more image regions; and apply the adjusted at least one modified text detection parameter to the respective image region of the one or more image regions.

\* \* \* \* \*